(12) United States Patent
Sinn (10) Patent No.: US 6,961,056 B2
(45) Date of Patent: Nov. 1, 2005

(54) SYNCHRONIZED VISUALIZATION OF PARTIAL SCENES

(75) Inventor: Christof Sinn, Mühlacker (DE)

(73) Assignee: Siemens Aktiengesellschaft, München (DE)

(*) Notice: Subject to any disclaimer, the term of this patent is extended or adjusted under 35 U.S.C. 154(b) by 321 days.

(21) Appl. No.: 10/291,221

(22) Filed: Nov. 8, 2002

(65) Prior Publication Data

US 2003/0128206 A1 Jul. 10, 2003

(30) Foreign Application Priority Data

Nov. 8, 2001 (DE) .......................................... 101 54 794

(51) Int. Cl.[7] .............................................. G06T 15/00
(52) U.S. Cl. ..................................................... 345/419
(58) Field of Search ........................................ 345/419

(56) References Cited

U.S. PATENT DOCUMENTS

| | | | | |
|---|---|---|---|---|
| 5,848,115 A | * | 12/1998 | Little et al. ..................... | 378/4 |
| 5,880,734 A | * | 3/1999 | Light ........................... | 345/419 |
| 5,923,307 A | * | 7/1999 | Hogle, IV ...................... | 345/4 |
| 6,529,206 B1 | * | 3/2003 | Ohki et al. ................... | 345/619 |
| 6,573,913 B1 | * | 6/2003 | Butler et al. ................. | 345/761 |

OTHER PUBLICATIONS

"Beating the Limitations of Camera–Monitor Mediated Telepresence with Extra Eyes", 1996, Conference on Human Factors in Computing Systems, ACM 0–89791–777–4/96/04.*

* cited by examiner

*Primary Examiner*—Almis R. Jankus
*Assistant Examiner*—Jon Hadidi
(74) *Attorney, Agent, or Firm*—Henry M. Feiereisen (57) ABSTRACT

A method and system for synchronized visualization of two partial scenes, in particular for three-dimensional rendering of contour surfaces of two workpieces, is described. A user opens several partial scenes and selects those partial scenes which are to be synchronized. The user then pushes a button on the taskbar (e.g., "Share-Camera") corresponding to the scenes. The partial scenes are synchronized by associating all synchronized partial scenes with a main camera, whereby manipulation of the scene content of one window affects the (all) synchronized partial scenes of the other windows. The synchronization is independent of the mode of visualization in the individual window. In this way, several partial scenes can be visualized simultaneously within an application. Advantageously, the partial scenes can be manipulated independently of each other.

13 Claims, 3 Drawing Sheets

SYNCHRONIZED VISUALIZATION OF PARTIAL SCENES

CROSS-REFERENCES TO RELATED APPLICATIONS

This application claims the priority of German Patent Application Serial No. 101 54 794.3, filed Nov. 8, 2001, pursuant to 35 U.S.C. 119(a)–(d), the disclosure of which is incorporated herein by reference.

BACKGROUND OF THE INVENTION

The present invention relates to a method for the synchronized visualization of two partial scenes, in particular for the three-dimensional rendering of contour surfaces of two workpieces, as well as a corresponding device, in particular a simulation computer.

In CNC-controlled processing machines, a workpiece is typically either encoded directly or the workpiece is first modeled using a CAD system and thereafter converted into an equivalent CNC parts program. The resulting CNC parts programs and/or the CAD model then correspond to perfect processing commands for the processing machine. The CNC programs is then loaded into a CNC controller and the processing machine is controlled according to the CNC program.

If the workpiece manufactured according to this CNC program is within the desired manufacturing tolerances of an ideal workpiece, then this approach causes no problem. However, if the manufactured workpiece does not meet the desired requirements, then the process needs to be optimized and the necessary changes, for example in the CNC program, have to be made so that an acceptable workpiece can be produced.

It is possible to change sequentially individual processing commands and/or individual operating parameters of the processing machine, to produce a new workpiece and to then test the new workpiece. However, this approach is very time consuming and expensive, and wastes material. Moreover, the cause for deviations between the actually manufactured workpiece and the desired workpiece it is frequently not known.

For this reason, there is an increasing trend to simulate mechatronic systems, such as industrial processing machines. However, a visualization environment is needed for analyzing the simulation results and for realistically rendering the surface of a workpiece generated by the simulation. The visualization environment is particularly important for the process simulation.

Such a visualization environment is particularly important because visualization allows a better evaluation of the contours of several different workpieces calculated by the simulation system or of the differences between the actually produced workpiece and the desired workpiece. In a simulated milling operation, for example, milling points and the milling path as well as possibly an associated area workpiece contour have to be rendered. An evaluation of such virtually machined workpiece surfaces or other surfaces requires a differential comparison between parts programs with milled contours of individual control components (monitoring principle).

Modern visualization elements provide three-dimensional rendering and can be integrated with other applications. The rendered content represents orthographic and/or perspective three-dimensional projections which can be interactively changed by the user. The user can typically rotate, displace and size (zoom) the rendered content. User-friendly visualization elements can also allow the user to obtain associated information by selecting certain details, such as for example the dimensions, spatial location or relationship to other details of the scene.

This leads to a better understanding of the manufacturing process. Moreover, the surface quality of the workpiece to be manufactured can be determined and analyzed already in the design stage, so that the existing parameter values of the control and drive of the machine tool can be optimized.

Accordingly, a "virtual workpiece" can be manufactured and/or the manufacturing operation can be carried out virtually. It is hence not necessary to actually produce a workpiece. In principle, there is not even a need for a processing machine. The number of prototypes can be significantly reduced through simulation and virtual production which saves costs.

This applies to a comparison of the same workpiece fabricated in two different ways (e.g. with differently parameterized machine tools), or a workpiece which is processed by different techniques, e.g. scrubbing, pre-sizing, sizing.

Conventional methods for visualizing several workpiece surfaces are limited to rendering the surfaces of different workpieces individually in graphic form. Hereby, corresponding partial scenes are typically visualized and evaluated sequentially and separately.

Accordingly, it would be desirable and advantageous to provide an improved and more refined visualization of two or more three-dimensional contoured surfaces, for example of workpieces, so that a user can effectively compare even small differences between such surfaces and thereby evaluate surface qualities and differences between the surface qualities.

SUMMARY OF THE INVENTION

According to one aspect of the present invention, a method is provided for synchronized visualization of two partial scenes, in particular for three-dimensional rendering of contour surfaces of two workpieces. The method includes the following process steps:

rendering a first partial scene in a first window of a visualization environment in an associated first view, simultaneously rendering a second partial scene in a second window of the visualization environment in an associated second view, providing an initial neutral main view, linking of the two partial scenes by
  selecting one partial scene and
  importing the parameters of the view associated with the selected partial scene into the main view, and
  associating the main view with the two partial scenes by rendering both partial scenes in the corresponding windows according to the main view, and importing a manipulation of a partial scene in one window into the main view and rendering the two partial scenes in the corresponding windows according to the main view.

According to another aspect of the invention, the two partial scenes can also be linked by
  selecting one partial scene and
  importing the parameters of the view associated with the selected partial scene into the main view, and
  associating the main view with the selected partial scene and
  copying the parameters of the main view into the view of the other partial scene in the other window, importing a manipulation of the selected partial scene into the main view and copying the parameter of the main view into the view of the other partial scene in the other window, or importing a manipulation of the other partial scene into the associated view and copying the parameters of this view into the main view, and rendering the selected partial scene according to the main view and rendering the other partial scene according to the partial view associated with the other partial scene.

It has proven to be advantageous in both cases to associate the first view with a first data structure, associate the second view with a second data structure, associate the main view with a third data structure, providing each data structure with memory locations for receiving all parameters required for a complete description of a view, and importing a selected view into another view by copying the parameters of the data structure associated with the selected view into the data structure associated with the other view.

According to an advantageous embodiment of the invention, the synchronization process can be terminated by decoupling the two partial scenes by importing the parameters of the main view into the two views of the two partial scenes and associating the corresponding partial scene in the corresponding window with the corresponding view, and importing a manipulation of the partial scene in one of the windows into the corresponding view and rendering this partial scene in the corresponding window according to the associated view.

The aforedescribed method of the invention is particularly suited for manipulating the view of a partial scene by moving the content of the partial scene in a window by zooming and/or rotation and/or translation, which is particularly effective in evaluating the surface qualities of workpieces, in particular in the context of virtual manufacturing of such workpieces with different machining instructions.

The method of the invention can be implemented using a suitably programmed simulation computer with software segments executed on the computer, with the software segments performing the various method steps on the computer.

According to yet another aspect of the invention, a device for synchronized visualization of two partial scenes includes a visualization environment, in particular a display, with a first window for displaying a first partial scene in an associated first view, and a second window for simultaneously displaying a second partial scene in a corresponding second view, a first memory adapted to receive parameters of the first view of the first partial scene, a second memory adapted to receive parameters of the second view of the second partial scene, a third memory adapted to receive parameters of a main view, a means for linking the two partial scenes, in particular a software switching element (button), with a means for selecting a partial scene, and a means for copying the parameters of the memory of the view associated with the selected partial scene into the third memory associated with the main view, and a means for linking the two windows with the content of the third memory associated with the main view, and a means for rendering both partial scenes in the respective window according to the parameters of the third memory, and a means for importing the changes in the parameters caused by a manipulation of a partial scene in one of the windows into the third memory.

Still another advantageous device for synchronized visualization of two partial scenes includes a visualization environment, in particular a display, with a first window for displaying a first partial scene in an associated first view, and a second window for simultaneously displaying a second partial scene in a corresponding second view, a first memory adapted to receive parameters of the first view of the first partial scene, a second memory adapted to receive parameters of the second view of the second partial scene, a third memory adapted to receive parameters of a main view, a means for linking the two partial scenes, in particular a software switching element (button), with a means for selecting a partial scene, a means for copying the parameters of the memory of the view associated with the selected partial scene into the third memory associated with the main view, a means for linking the window with the selected partial scene with the content of the third memory means associated with the main view, a means for copying the parameters of the third memory into the memory associated with the partial scene in the other window, a means for rendering both partial scenes in the respective window according to the parameters of the respective associated memory, a means for importing the changes in the parameters caused by a manipulation of a partial scene in one of the windows into the third memory, and a means for importing the changes in the parameters caused by a manipulation of the other partial scene in one of the windows into the associated memory of the partial scene.

The invention can also be implemented with a computer program product which can be loaded directly into the internal memory of a digital computer and which includes software segments for carrying out the aforedescribed method steps, when the program product is executed on a computer.

The method of the invention for synchronized visualization of two partial scenes, as described above, can advantageously be employed for evaluating surface qualities of workpieces, in particular in conjunction with a virtual fabrication of such workpieces with different machining instructions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals.

The invention will be described hereinafter with the aid of so-called scene graphs with reference to FIGS. 1 to 5, which are particularly suited to represent the functionality.

The system and method can be implemented in the form of a software environment which provides a suitable visualization environment on a graphic computer.

For this purpose, several windows are created to render partial visualization scenes—using, for example, the Windows® MDI technology (Multiple Document Interface). Each window includes a visualization scene. In the context of the entire application, each window includes a partial visualization scene or partial scene. Each partial visualization scene is composed of different geometric objects (points, lines, surface grids represented as lines, surface grids represented as filled objects, etc.) that render a virtual process, such as a milling process, and is provided primarily for visualizing workpiece contours.

For visualizing the scene (of the corresponding scene objects), a visualization environment is used which can be based on known graphic libraries. The application uses, for example, the object-oriented graphics library "OpenInventor" commercially available the Company TGS. Implementation could also be realized by using the freely available graphic library "OpenGL". For rendering specific scene objects, each partial scene requires a "camera" representing the view of the partial scene and/or the viewing angle of a user in front of the display screen of the visualization environment.

If the visualization environment "OpenInventor" is used, then a camera object is instantiated and added to one of the aforedescribed so-called scene graphs.

In the following, the individual elements of scene graphs are listed, wherein the reference numerals 1 to 10 are associated with the graphic symbols depicted in FIG. 2.

1 Separator node (SoSeparator)—the Separator subdivides the graphs into partial graphs. Feature nodes are valid in the respective partial graphs.
2 Selection nodes (SoSelection)—children of these nodes can be selected. The method for selection can be defined. The selection node is simultaneously a Separator.
3 Switch nodes (SoSwitch)—offers the possibility to mask individual children (partial graphs). Possible settings are ALL, NONE, CHILD(i).
4 Feature nodes—specifies a modal feature.
5 Metric and/or topology nodes.
6 Light nodes—specifies the corresponding light (illumination) model.
7 Geometry node—specifies the shape of the corresponding object.
8 Camera node—specifies the type and setting of the camera.
9 Callback node—offers the possibility to functionally react to events.
10 Sub-graph—subdivides the scene graphs into partial graphs.

Figure 3:
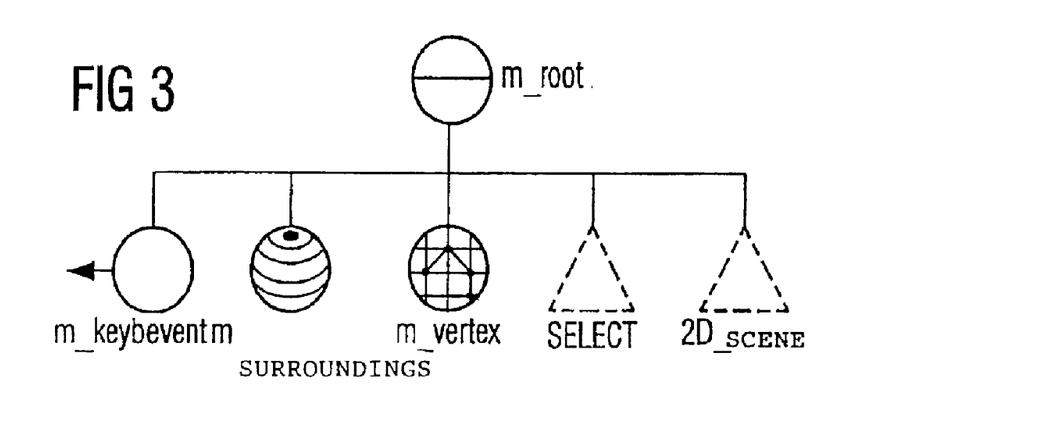
FIGS. 3 to 5 depict a configuration of an exemplary partial visualization scene with scene graphs using the symbols of FIG. 2.
Figure 4:
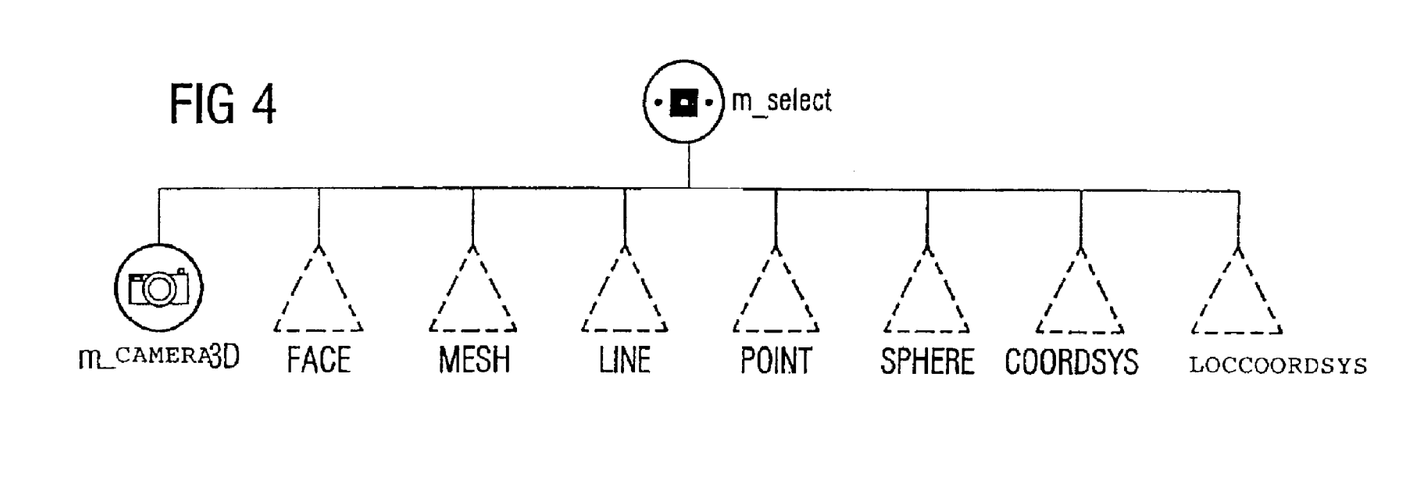
Figure 5:
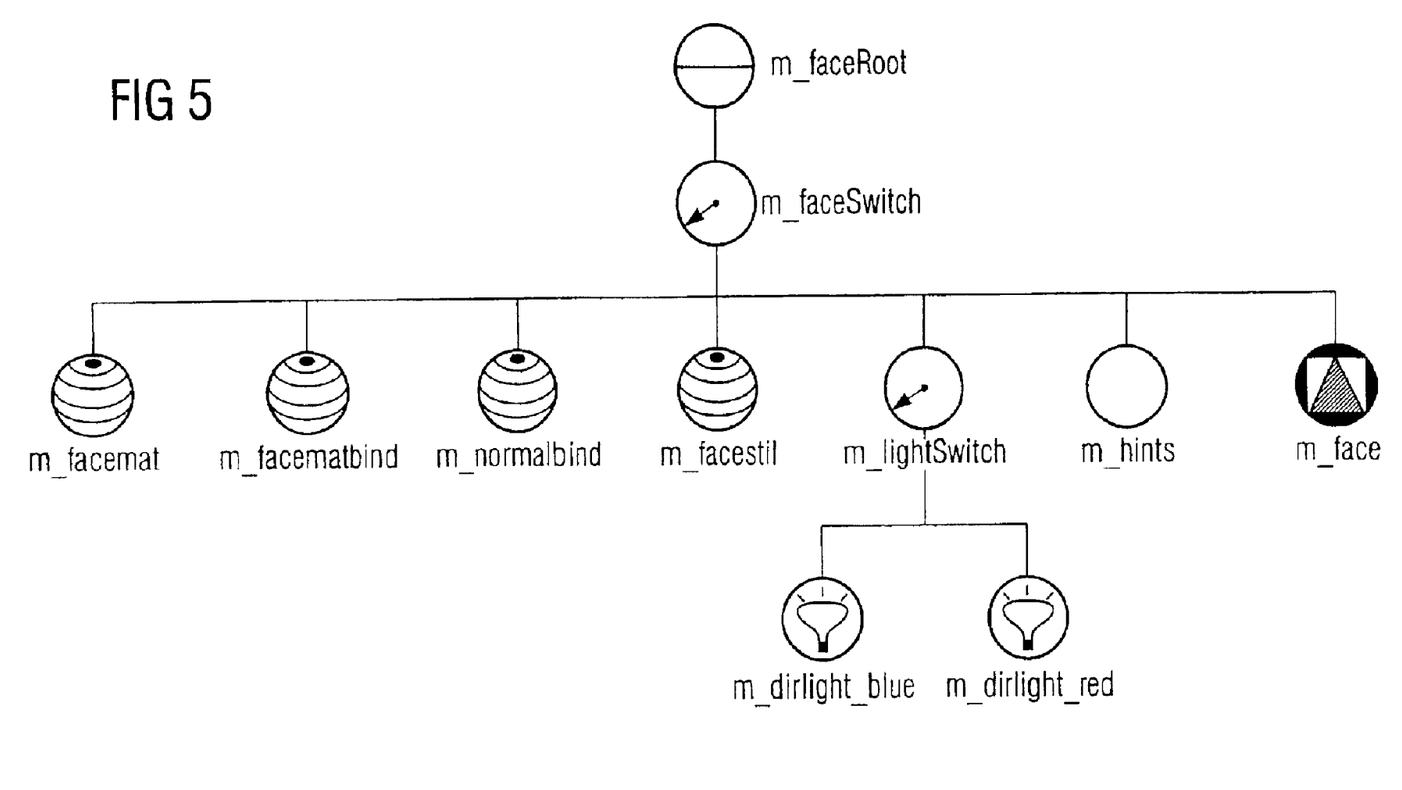

The diagrams of FIGS. 3 to 5 depict a configuration of a typical partial visualization scene composed of such elements. FIG. 3 shows a tree structure of a scene graph with a Separator node m_root as a root node, with a Callback node m_keybevent, a feature nodes m_surroundings, and a topology node m_vertex that branches off the root node. Two sub-graphs SELECT and 2D_SCENE also branch off.

Figure 2:
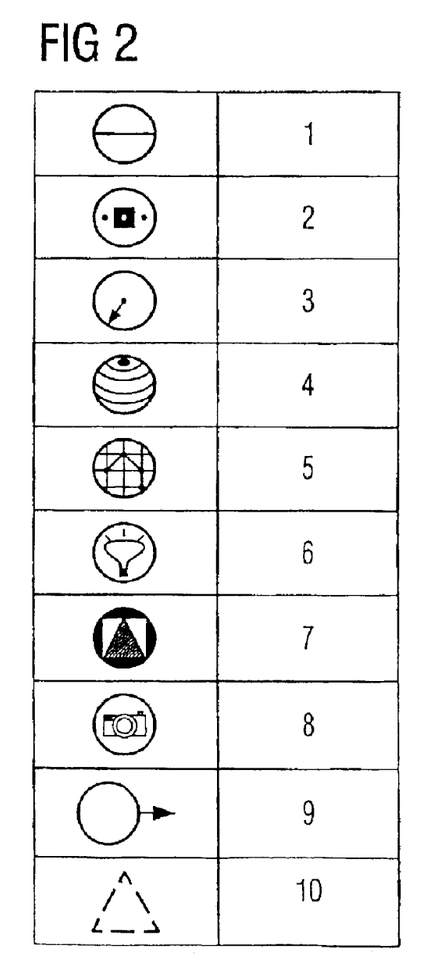
FIG. 2 depicts possible components of a scene graph.

The two other scene graphs, which depict additional examples, can be easily deduced from the Table above that shows the graphic symbols of FIG. 2. The respective function is indicated by the reference symbols.

Of interest for the present invention is primarily the camera object m_Camera3D in FIG. 4 and the two light sources m_dirlight_blue and m_dirlight_red in FIG. 5, which directly affect the rendition of a partial scene in a window of the visualization environment. Each partial visualization scene has its own camera object in the corresponding scene graph. The other elements relate to the selection of options which lead to the node elements of the scene graphs.

The camera object is of particular importance for the present invention. It includes a plurality of object data and object methods, with examples of such object data and object methods given below.

Figure 1:
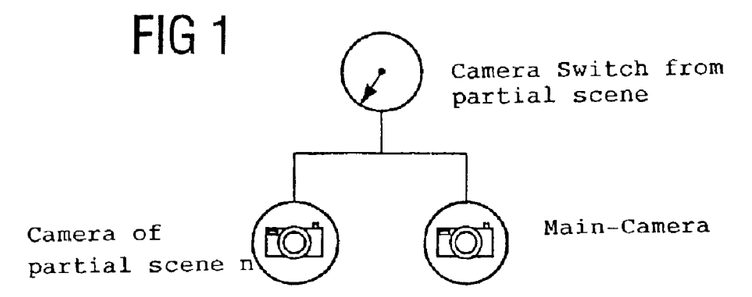
FIG. 1 depicts a synchronization of partial scenes based on scene graphs of the individual partial visualization scenes.

Examples of object data:
viewportMapping
position
orientation
aspectRatio
nearDistance, farDistance, focalDistance
pointAt Examples of object methods:
GetViewVolume
ViewAll
getViewportBounds When the application starts, a main camera is added to the application. As shown in the diagram of FIG. 1, the main camera is added in the scene graphs of the individual partial visualization scenes. The individual camera of a partial scene, called 'camera', and the main camera, called 'Main_Camera', can be selected in each partial scene n with a corresponding switch node Camera_Switch.

When the user pushes a so-called Share-Camera-Button (for example, a software elements, Button) in any partial visualization scene, with each partial scene being provided with such Button, then the following happens:

If the corresponding partial scene uses its own camera (left camera in FIG. 1) at the time of synchronization, then the camera of the main window is overwritten with the values of the corresponding camera of the partial scene and this partial scene is associated with the camera of the main window (for example, by using the OpenInventor function "IvfSetActiveCamera" described in the following program example).

Conversely, if the corresponding partial scene uses the main camera (right camera in FIG. 1) at the time of synchronization, then the camera of the partial scene is overwritten with the values of the respective camera of the main window and the actual camera of the partial scene belonging to this partial scene is again associated with this partial scene.

In the following, a code segment of an exemplary software implementation in the programming language C++ with OpenInventor functionality is listed:

```
    if (m_switchCamera->whichChild.getValue( ) == 0) {
        theApp.m_camera->viewportMapping =
m_personalCamera->viewportMapping.getValue ( ):
        theApp.m_camera-
>position.setValue (m_personalCamera->position.getValue ( ));
        theApp.m_camera-
>orientation.setValue (m_personalCamera-
>orientation.getValue( ));
        theApp.m_camera->aspectRatio-m_personalCamera-
>aspectRatio;
        theApp.m_camera->nearDistance "m_personalCamera-
>nearDistance;
        theApp.m_camera->farDistance == m_personalCamera-
>farDistance
        theApp.m_camera->focalDistance = m_personalCamera-
>focalDistance;
        m_switchCamera->whichChild = 1;
        view->IvfsetActiveCamera (theApp.m_camera);
        m_switchImage->whichChild = SO_SWITCH_ALL;
    }
    else {
        m_personalCamera ->viewportMapping =
theApp.m_camera-> viewportMapping.getValue( );
        m_personalCamera-
>position.setValue (theApp.m_camera->position.getValue ( ));
        m_personalCamera-
>orientation.setValue (theApp.m_camera-
>orientation.getValue ( ).);
        m_personal Camera->aspectRatio = theApp.m_camera-
>aspectRatio ;
        m_personalCamera->nearDistance = theApp.m_camera-
>nearDistance;
        m_personalCamera->farDistance = theApp.m_camera-
>farDistance;
        m_personal Camera->focalDistance = theApp.m_camera-
>focalDistance;
        m_switchCamera->whichChild = 0,
        view->IvfSetActiveCamera (m_personalCamera);
        m_switchImage->whichChild = SO_SWITCH_NONE;
    }
}
```

The assignment of the variables and functions is closely related to the semantic used in the Figures, which makes the preceding functionality easy to understand.

A partial scene can be synchronized as often as desired.

If a user can open several partial scenes (for example representation of the parts program, individual results of control components) and optionally arrange these partial scenes vertically or horizontally with a menu selection. The user then selects those partial scenes that are to be synchronized and clicks in these partial scenes the "Share-Camera" button on the taskbar.

The partial scenes are now synchronized, i.e., the movement of the scene content of one window, such as zooming, rotation and/or translation, affects the (all) synchronized partial scenes of the other windows. The synchronization is independent of the type of visualization of the individual windows, i.e., the selected setting "representation of points, lines and/or areas" of the window is maintained.

Advantageously, several partial scenes can be visualized simultaneously within one application. Alternatively, the partial scenes can also be manipulated independent of each other.

The selected partial scenes hence always have the same settings, such as camera location, observer location, angle of incident light, etc. If the user zooms to the surface of a partial scene—for example to recognize inaccuracies on a micrometer scale—, then he can evaluate, for example, the surface results of other control/monitoring components and/or different renditions (milling path) in parallel and under exactly identical general conditions.

This is made possible because the application can generate several windows (partial scenes) (for example, MDI applications). When several partial scenes are open and accessible, then the system and method of the invention can be used to synchronize scene content. If content of several scenes is synchronized, then the cameras of the various scenes are linked to cover more than one scene (window). The desired result is obtained by coupling the cameras of the various scenes.

The synchronized graphic rendition according to the invention makes it easier for the user to evaluate surface qualities of contours which are obtained at different locations. By synchronizing and rendering partial scenes, the two virtually fabricated workpiece contours can be directly related within one scene on a display.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for virtual machining of workpieces, comprising the following process steps:
   synchronously evaluating a surface quality of at least two workpieces by
      rendering a first partial scene of a first workpiece machined with a first machining instruction in a first window of a visualization environment in an associated first view, and
      simultaneously rendering a second partial scene of at least one other workpiece machined with at least one second machining instruction in a second window of the visualization environment in a associated second view,
   providing an initially neutral main view,
   linking of the first and second partial scenes by
      selecting one o the first and second partial scenes and importing the parameters of the view associated with the selected partial scene into the main view, and
      associating the main view with the first and second partial scenes by rendering the first and second partial scenes in the corresponding windows according to the main view, and
      importing a manipulation of one of the first and second partial scenes rendered in one window into the main view and rendering the first and second partial scenes in the corresponding windows according to the main view.

2. A method for virtual machining of workpieces, comprising the following process steps:
   synchronously evaluating a surface quality of at least two workpieces by
      rendering a first partial scene of a first workpiece machined with a first machining instruction in a first window of a visualization environment in an associated first view, and
      simultaneously rendering a second partial scene of at least one other workpiece machined with at least one second machining instruction in a second window of the visualization environment in an associated second view, providing an initially neutral main view, linking of the first and second partial scenes by
selecting one of the first and second partial scenes and importing the parameters of the view associated with the selected partial scene into the main view,
associating the main view with the selected partial scene, and
copying the parameters of the main view into the view of the other partial scene in the other window,
importing a manipulation of the selected partial scene into the main view and copying the parameter of the main view into the view of the other partial scene in the other window, or
importing a manipulation of the other partial scene into the corresponding view and copying the parameters of the corresponding view into the main view, and
rendering the selected partial scene according to the main view and rendering the other partial scene according to the partial view associated with the other partial scene.

3. The method of claim 1, wherein
the first view is associated with a first data structure,
the second view is associated with a second data structure,
the main view is associated with a third data structure, wherein
each data structure includes memory locations for receiving all parameters required for a complete description of a view, and
a selected view is imported into another view by copying the parameters of the data at structure associated with the selected view into the data structure associated with the other view.

4. The method of claim 2, wherein
the first view is associated with a first data structure,
the second view is associated with a second data structure,
the main view is associated with a third data structure, wherein
each data structure includes memory locations for receiving all parameters required for a complete description of a view, and
a selected view is imported into another view by copying the parameters of the data structure associated with the selected view into the data structure associated with the other view.

5. The method of claim 1, including the following additional process steps:
decoupling the first and second partial scenes by
importing the parameters of the main view into the first and second views of the first and second partial scenes and
associating the corresponding partial scene in the corresponding window with the corresponding view,
importing a manipulation of one of the first and second partial scenes in a corresponding one of the windows into the corresponding view and rendering the manipulated partial scene in the corresponding window according to the associated view.

6. The method of claim 1, wherein a manipulation of the view of a partial scene comprises movement of the content of the partial scene in a corresponding window by zooming and/or rotating and/or translating.

7. The method of claim 2, wherein a manipulation of the view of a partial scene comprises movement of the content of the partial scene in a corresponding window by zooming and/or rotating and/or translating.

8. A computer program product which can be loaded directly into an internal memory of a digital computer and executed on the computer, for virtual machining of workpieces, said computer program containing software segments that cause the computer to execute the following process steps:
synchronously evaluating a surface quality of at least two workpieces by
rendering a first partial scene of a first workpiece machined with a first machining instruction in a first window of a visualization environment in an associated first view, and
simultaneously rendering a second partial scene of at least one other workpiece machined with at least one second machining instruction in a second window of the visualization environment in an associated second view,
providing an initially neutral main view,
linking of the first and second partial scenes by
selecting one of the first and second partial scenes and
importing the parameters of the view associated with the selected partial scene into the main view,
associating the main view with the selected partial scene
copying the parameters of the main view into the view of the other partial scene in the other window,
importing a manipulation of the selected partial scene into the main view and copying the parameter of the main view into the view of the other partial scene in the other window, or
importing a manipulation of the other partial scene into the corresponding view and copying the parameters of the corresponding view into the main view, and
rendering the selected partial scene according to the main view and rendering the other partial scene according to the partial view associated with the other partial scene.

9. A computer program product which can be loaded directly into an internal memory of a digital computer and executed on the computer, for virtual machining of workpieces, said computer program containing software segments that cause the computer to execute the following process steps:
synchronously evaluating a surface quality of at least two workpieces by
rendering a first partial scene of a first workpiece machined with a first machining instruction in a first window of a visualization environment in an associated first view, and
simultaneously rendering a second partial scene of at least one other workpiece machined with at least one second machining instruction in a second window the visualization environment in an associated second view,
providing an initially neutral main view,
linking of the first and second partial scenes by
selecting one of the first and second partial scenes and
importing the parameters of the view associated with the selected partial scene into the main view, and
associating the main view with the first and second partial scenes by rendering the first and second partial scenes in the corresponding windows according to the main view, and importing a manipulation of one of the first and second partial scenes rendered in one window into the main view and rendering the first and second partial scenes in the corresponding windows according to the main view.

10. The method of claim 1, wherein rendering the partial scenes comprises rendering two-dimensional or three-dimensional visualization of contour surfaces of the at least two workpieces.

11. The method of claim 2, wherein rendering the partial scenes comprises rendering two-dimensional or three-dimensional visualization of contour surfaces of the at least two workpieces.

12. The method of claim 8, wherein rendering the partial scenes comprises rendering a two-dimensional or three-dimensional visualization of contour surfaces of the at least two workpieces.

13. The method of claim 9, wherein rendering the partial scenes comprises rendering two-dimensional or three-dimensional visualization of contour surfaces of the at least two workpieces.

* * * * *

UNITED STATES PATENT AND TRADEMARK OFFICE
CERTIFICATE OF CORRECTION

PATENT NO. : 6,961,056 B2
DATED : November 1, 2005
INVENTOR(S) : Christof Sinn

It is certified that error appears in the above-identified patent and that said Letters Patent is hereby corrected as shown below:

Column 8,
Line 46, change "o" to -- of --.

Column 11,
Lines 7 and 11, change "rendering two-dimensional" to -- rendering a two-dimensional --.

Signed and Sealed this

Twenty-fourth Day of January, 2006

JON W. DUDAS
*Director of the United States Patent and Trademark Office*